Feb. 10, 1931.  A. E. TOMLINSON  1,791,914
VALVE FOR URNS
Filed Dec. 15, 1927

INVENTOR.
Alfred E. Tomlinson
BY
Fay, Oberlin & Fay
ATTORNEYS.

Patented Feb. 10, 1931

1,791,914

UNITED STATES PATENT OFFICE

ALFRED E. TOMLINSON, OF CLEVELAND, OHIO

VALVE FOR URNS

Application filed December 15, 1927. Serial No. 240,132.

The present invention relates to valves and fittings therefor of the type adapted for use on coffee urns and the like. More particularly the present invention provides a fitting for connection with the urn and means for attaching the valve thereto to leave a straight unobstructed pipe nipple for easy cleaning and the valve proper provides a rotary plug valve with universal type of connection between the operating handle and the rotatable plug, the connecting mechanism being so arranged as to provide for easy operation even after the valve plug becomes worn. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
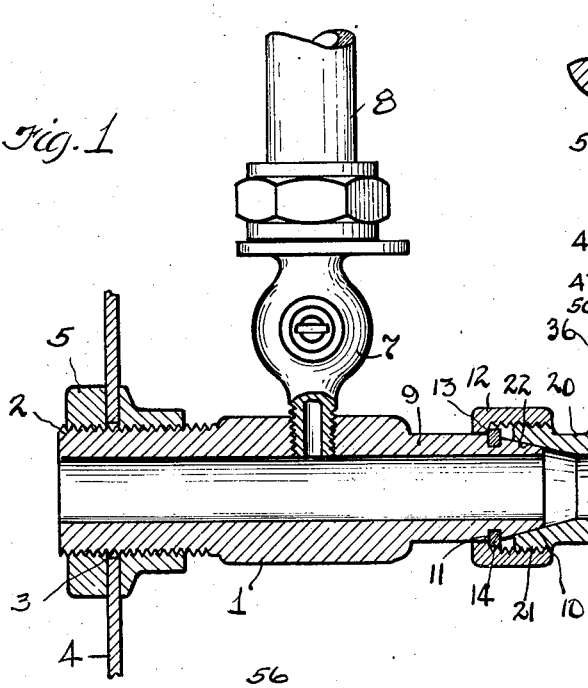
Figure 2:
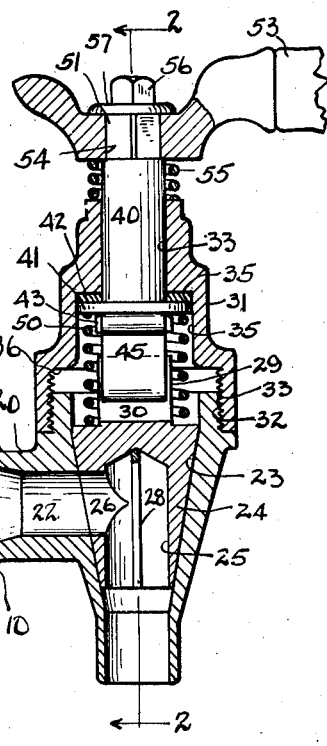
Figure 2:
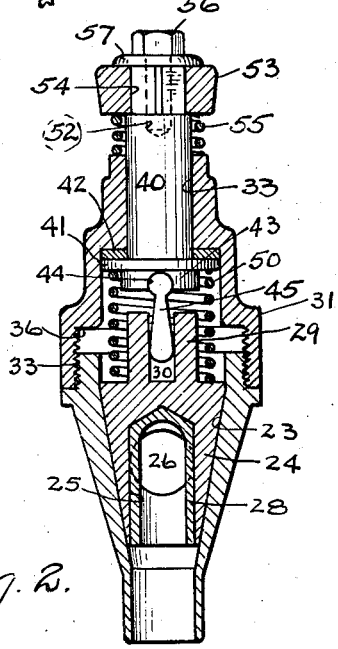
Figure 3:
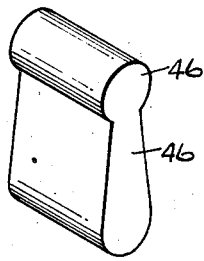

Fig. 1 is a central vertical sectional view through the valve and fitting, Fig. 2 is a sectional view of parts at right angles to Fig. 1; and Fig. 3 is a perspective view of the valve tongue.

The present valve mechanism consists of a connecting fitting or nipple 1 exteriorly threaded at its inner end 2 for engagement with the threaded member 3 built into the urn 4 and this threaded end 2 is provided with an interiorly threaded locking nut 5. The central portion 6 of the nipple is preferably squared to be easily engaged by a wrench and is provided with the usual upwardly extending valved, connecting union 7 for the sight gauge tube 8. The outer end of the nipple provides a tubular portion 9 and a conical end 10 with an annular groove 11 therebetween. A coupling nut 12 is mounted on the tubular portion 9, this nut being interiorly threaded and having a shoulder 13 at its inner end. Mounted in the groove 11 is a split washer 14 adapted to be engaged by the shoulder 13 of the nut to allow the valve body 20 to be coupled tightly to the fitting.

The valve or cock proper consists of a hollow lower valve body 20 having a laterally extending threaded boss 21 for engagement with the fitting, this boss having a coned interior passage 22 to receive the end 10 of the fitting to provide a ground joint to prevent leakage.

The valve body is hollow and the interior 23 is conical to receive a complementary shaped valve plug 24 having a central passage 25 and a lateral passage 26 for communication with the bore 22 of boss 21. The central passage is preferably provided with ribs 28 in the form of a U, these ribs preventing splashing of the liquid passing through the central passage and forcing such liquid to flow out in a solid stream. The valve plug has an upwardly extending stem 29 provided with a slot 30. The upper portion 31 of the valve body is hollow and is interiorly threaded at its lower end 32 to engage with the threads 33 on the upper end of the lower body portion 20. This upper body portion has a central bore 33 and an enlarged cylindrical passage 34 forming a shoulder 35 therebetween and there is a second shoulder 36 between the enlarged passage 34 and the lower portion 37 having the internal threads 32.

The valve operating mechanism consists of an operating member 40 fitting in the central bore 33 and provided at the bottom with a disk 41 carrying a washer 42 adapted to engage against the shoulder 35. On the bottom of the disk is a button 43 having a curved sided slot 44 to receive an operating tongue 45 which has an enlarged cylindrically shaped end 46. The tongue is shorter than the slot and thus moves through the same but is prevented from passing out by peening the edges of the slot inwardly as at 47. The tongue also has a rocking movement of about 33 degrees. This tongue below the cylindrical end is wedge shaped and has its lower end rounded and the tongue is adapted to engage in the slot 30 in the plug stem 29 and has a snug fit therein so as to eliminate lost motion. The wedge shape of the tongue allows for limited movement laterally between the operating member and the valve plug or for slight tipping of the two relative to each other and the tongue is also capable of longitudinal movement in the slot so as to provide for connection of limited universal movement between the operating member and the valve plug. To maintain the necessary tension on the valve plug a coil spring 50 is mounted around the plug stem 29 between the plug body and the disk 41. The upper end of the operating member 40 extends above the body portion 31 and is provided with a squared end 51 and a tapped aperture 52. The operating handle 53 has a square aperture 54 adapted to fit over the end 51 of the member 40 and a second coil spring 55 is mounted around the extending portion of the operating member 40 between the top of the upper portion 31 of the valve body and the handle member 53. The handle is secured in position by a headed bolt 56 engaging in the tapped aperture 52, a washer 57 being preferably mounted between the bolt head and the top of the handle member.

The present valve and fitting is particularly adaptable for coffee urns and the like where the valve must be easily removable, and easily taken apart for cleaning and this is usually done by taking the valve off and apart and boiling the valve parts. In addition the fitting provides a smooth bore pipe into the urn which may be easily cleaned by a brush, the ground joint connection maintaining a smooth bore with no internal threads in the liquid passage. The valve operating mechanism provides for easy turning of the valve plug even if the plug and operating member do not remain in alignment and allows for maintaining the necessary tension on the plug without undue binding or friction.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A valve comprising a two part valve body, a valve plug rotatably mounted in one part thereof, an operating member rotatably mounted in the other part of said valve body, means to transmit rotary motion from said operating member to said plug, said means including a tongue carried by said operating member and capable of limited rocking and transverse sliding movement with respect thereto and adapted for engagement with said valve plug.

2. A valve comprising a two part valve body, a valve plug rotatably mounted in one part of said body and having an upwardly extending slotted stem, an operating member rotatably mounted in the other part of said body, and a tongue carried by said operating member and capable of limited universal movement with respect thereto and adapted to engage in said slotted stem to transmit rotary motion from said operating member to said plug.

3. A valve comprising a two part valve body, a valve plug rotatably mounted in one part of said body and having an upwardly extending slotted stem, an operating member rotatably mounted in the other part of said body, and means to transmit rotary motion from said operating member to said plug, said means comprising a tongue carried by said operating member and having a limited lateral movement and a limited tilting movement with respect thereto and having its free end adapted to slidably fit said slot in said plug stem.

4. In a valve of the class described, a casing providing a tapered seat, a rotary plug received in said seat, a stem on said plug and formed with a vertically extending slot, a spindle mounted in said casing, and formed in its one end with a part-cylindrical slot, and a tongue having a part-cylindrical end received in said spindle slot, and having its opposite end received in said stem slot.

5. In a valve of the class described, a casing providing a tapered seat, a rotary plug received in said seat, a stem on said plug and formed with a vertically extending slot, a spindle mounted in said casing, and formed in its one end with a part-cylindrical slot, means tending to separate said plug and spindle, and a tongue having a part-cylindrical end received in said spindle slot, and having its opposite end received in said stem slot.

6. In a valve of the class described, a casing providing a tapered seat, a rotary plug received in said seat, a stem on said plug and formed with a vertically extending slot, a spindle mounted in said casing, and formed in its one end with a part-cylindrical slot, resilient means in said casing tending to separate said plug and spindle, and a tongue having a part-cylindrical end received in said spindle slot, and having its opposite end received in said stem slot.

7. In a valve of the class described, a casing providing a tapered seat, a rotary plug received in said seat, a stem on said plug and formed with a vertically extending slot, a spindle mounted in said casing, and formed in its one end with a part-cylindrical slot, and a tongue having a part-cylindrical end slidably received in said spindle slot, and having its opposite end received in said stem slot.

8. In a valve of the class described, a casing providing a tapered seat, a rotary plug received in said seat, a stem on said plug and formed with a vertically extending slot, a spindle mounted in said casing, and formed in its one end with a part-cylindrical slot, resilient means in said casing tending to separate said plug and spindle, and a tongue having a part-cylindrical end slidably received in said spindle slot, and having its opposite end received in said stem slot.

9. In a valve of the class described, a casing providing a tapered seat, a cover member for said casing, providing a cavity, a tapered plug received in said seat, a stem on said plug and formed with a slot, an operating spindle carried by said cover member and extending into said cavity, and a tongue rockably secured to said spindle and disposed in said cavity, said tongue being received in said stem slot.

10. In a valve of the class described, a casing providing a tapered seat, a cover member for said casing, providing a cavity, a tapered plug received in said seat, a stem on said plug and formed with a slot, an operating spindle carried by said cover member and extending into said cavity, and a tongue rockably and slidably secured to said spindle and disposed in said cavity, said tongue being received in said stem slot.

11. In a valve of the class described, a casing providing a tapered seat, a cover member for said casing, providing a cavity, a tapered plug received in said seat, a stem on said plug and formed with a slot, an operating spindle carried by said cover member and extending into said cavity, and a tongue rockably secured to said spindle and disposed in said cavity, said tongue being rockably received in said stem slot.

12. In a valve of the class described, a casing providing a tapered seat, a cover member for said casing, providing a cavity, a tapered plug received in said seat, a stem on said plug and formed with a slot, an operating spindle carried by said cover member and extending into said cavity, and a tongue rockably and slidably secured to said spindle and disposed in said cavity, said tongue being rockably and slidably received in said stem slot.

13. A valve comprising a two-part casing, a slotted rotary plug mounted in one part thereof, a spindle rotatably mounted in the other part thereof, and means carried by said spindle and engageable in the slot of said plug, said means being rockable with respect to said plug and to said spindle.

14. A valve comprising a two-part casing, a rotary plug mounted in one part thereof, a spindle rotatably mounted in the other part thereof, and means carried by said spindle and rockable and transversely slidable with respect to said plug and to said spindle for connecting said plug and spindle.

Signed by me this 12th day of December, 1927.

ALFRED E. TOMLINSON.